Sept. 6, 1932.  W. H. D. BROUSE  1,875,987
FLUID DISPENSING DEVICE
Filed July 17, 1931
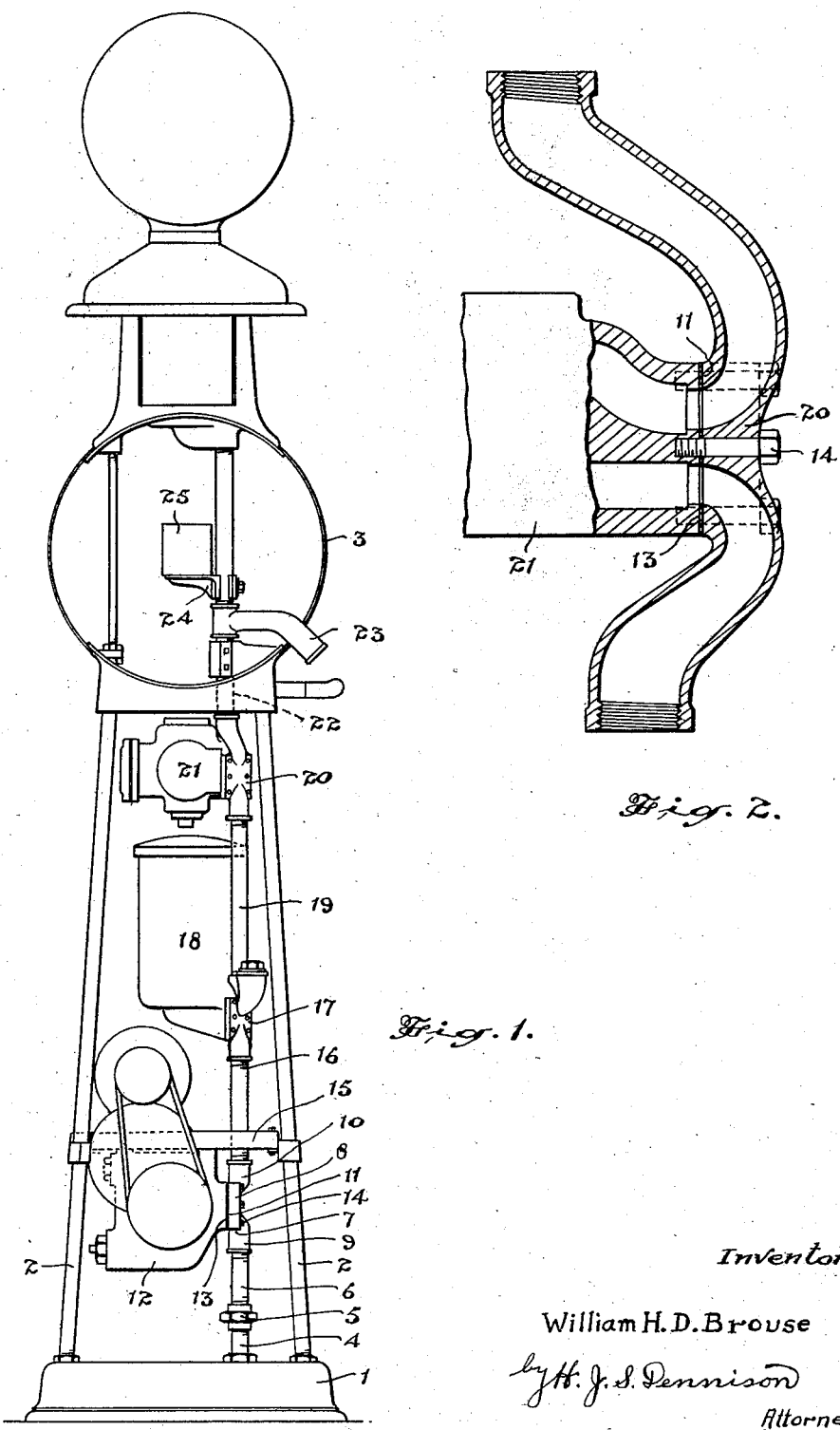
Inventor.
William H. D. Brouse
by H. J. S. Dennison
Attorney Patented Sept. 6, 1932

1,875,987

UNITED STATES PATENT OFFICE

WILLIAM H. D. BROUSE, OF TORONTO, ONTARIO, CANADA, ASSIGNOR TO SERVICE STATION EQUIPMENT CO. LIMITED, OF TORONTO, CANADA

FLUID DISPENSING DEVICE

Application filed July 17, 1931. Serial No. 551,415.

The principal objects of this invention are to facilitate the assembling of the several mechanisms used in a fluid dispensing device of the type used for dispensing gasoline, to provide a construction which will form a very rigid support for the several individual mechanisms and will enable the ready removal of any of the several mechanisms for repair or replacement without disturbing the other parts.

The principal features of the invention consist in the novel construction of a rigid tubular stem having a plurality of bye-passing devices rigidly incorporated thereinto, said bye-passing devices being constructed to support the fluid pump, a meter for measuring the fluid pumped and other desirable equipment, said supporting element being adapted to direct the fluid to and from the device supported thereby.

In the accompanying drawing, Figure 1 is an elevational view of the assembly structure of a gasoline dispensing pump made in accordance with this invention.

Figure 2 is a vertical mid-sectional detail of one of the by-passing supports arranged in the standard.

It is the usual practice in the manufacture of so-called gasoline pumps to mount the several mechanically operating devices such as the motor driven pump, the air eliminator, the meter and the indicator, upon the frame of the structure and the several mechanisms through which the fluid must pass are connected together by suitable pipe fittings. It is a very difficult matter to align these several devices. When it is desired to remove any one of the several instruments or mechanisms, the whole structure is disturbed and thrown out of alignment.

The present invention is extremely simple yet it accomplishes a very desirable saving in time and labour and produces a much more satisfactory article.

In the accompanying drawing, the base 1, converging legs 2 and clock drum 3 are of the ordinary type of construction.

Within the framework described a pipe connection 4 leading from the fluid supply tank is suitably supported in the base and connected to the upper end of this pipe by means of a universal coupling 5 is a short length of pipe 6.

Attached to the upper end of the pipe 6, preferably by threading, is a cast metal member 7 which may be termed a bye-passing manifold which is formed with a central block 8 of substantially rectangular form having a pair of pipe connections 9 and 10 extending outwardly therefrom and arranged in axial alignment with each other.

The passages through the pipe connections 9 and 10 are curved inwardly through the block 8 and open out through the flat face 11 thereof in the form of ports.

The gasoline pump 12 is constructed with a port face 13 having inlet and outlet ports therein which register with the ports in the block 8 and bolts 14 extend through the block 8 into suitably threaded holes in the pump structure.

The pump may be supported entirely by means of the bolts 14 and the block structure 8 but supplemental means for assisting in the supporting of the weight of the pump and here shown in the form of cross bars 15 connected to the legs 2 may be used.

A pipe length 16 is connected to the upper pipe connection 10 of the member 7 and to this is connected a bye-passing member 17 similar to the member 7 and having inlet and outlet ports leading to the inlet and outlet ports of an air eliminating device 18.

A further length of pipe 19 is connected to the member 17 which is in alignment with the pipes 6 and 16 and a bye-passing block 20 is connected to the upper end thereof. This latter block is similar to the other blocks and has connected to and supported thereby the meter 21 for measuring the flow of fluid. A further extension pipe 22 continues upwardly into the drum portion 3 and is rigidly held therein.

A discharge connection 23 leads to the dispensing hose and the rigid vertical part 22 forms a support for a bracket 24 which carries the dial indicating mechanism 25.

It will be readily understood from this description that the heavy pipe standard formed by the several pipe lengths connecting the bye-passing blocks 7, 17 and 20 forms a very rigid support for the different instruments connected thereto and by simply removing the bolts inserted through the heavy block portions of these members the instruments may be removed without disturbing any other element. The whole structure is easily and quickly assembled and no individual fitting and aligning of pipe connections is required.

What I claim as my invention is:—

1. In a fluid dispensing device, a rigid tubular upright having a plurality of mounting surfaces adapted to support mechanisms through which the fluid travels, said tubular upright having bye-passing passages opening through said mounting surfaces, and fluid controlling mechanisms supported from said surfaces and having inlet and discharge openings communicating with said bye-passing passages.

2. In a fluid dispensing device, a standard connected with a fluid supply, a plurality of bye-passing members arranged at intervals in said standard, each comprising a block having a pair of conduits curving to and opening through a face thereon, mechanisms through which the fluid is to pass each having a face secured against the face of one of the by-passing members in said standard and having inlet and outlet passages.

3. A fluid dispensing device comprising, a pipe connected with a fluid supply, a metal member secured on the upper end of said pipe and having a passage directed laterally and opening outwardly through the side thereof, said metal member having a passage therein with an opening adjacent to the aforesaid opening and an opening arranged in alignment with the opening connected with the pipe, a pump having intake and discharge openings connected with the lateral openings in the aforesaid member, a pipe connected to the latter opening in the aforesaid member and extending upwardly in alignment with the first mentioned pipe, laterally opening by-pass members connected with the latter pipe, and fluid operated mechanisms detachably connected with said by-pass members.

4. In a fluid dispensing device, a vertical standard having the passages therethrough connected at intervals and directed outwardly through laterally arranged ports arranged in pairs, and mechanisms through which the fluid is to travel detachably connected to said standard and having intake and discharge ports communicating with the laterally opening ports in said standard.

WILLIAM H. D. BROUSE.